United States Patent [19]

Singh

[11] Patent Number: 4,960,844
[45] Date of Patent: Oct. 2, 1990

[54] SILANE TERMINATED LIQUID POLYMERS

[75] Inventor: Hakam Singh, Bradbury, Calif.

[73] Assignee: Products Research & Chemical Corporation, Glendale, Calif.

[21] Appl. No.: 227,733

[22] Filed: Aug. 3, 1988

[51] Int. Cl.$^5$ .............................................. C08G 77/06
[52] U.S. Cl. ........................................ 528/17; 528/25; 528/28; 528/29; 556/420; 556/421
[58] Field of Search ....................... 556/419, 420, 421; 528/25, 28, 29, 17

[56] References Cited

U.S. PATENT DOCUMENTS

| | | | |
|---|---|---|---|
| 3,317,461 | 5/1967 | Plueddemann . | |
| 3,632,557 | 1/1972 | Brode . | |
| 3,676,478 | 7/1972 | Golitz et al. | 528/38 |
| 3,872,059 | 3/1975 | Ely . | |
| 3,923,748 | 12/1975 | Hutt et al. | 528/374 |
| 3,925,331 | 12/1975 | Ely . | |
| 3,979,344 | 9/1976 | Bryant et al. . | |
| 4,652,664 | 3/1987 | Singer et al. . | |
| 4,749,803 | 6/1988 | Dowbenko et al. | 556/414 |

FOREIGN PATENT DOCUMENTS 61-174224  8/1986  Japan .................... 556/427

Primary Examiner—John C. Bleutge
Assistant Examiner—Ralph H. Dean, Jr.
Attorney, Agent, or Firm—Poms, Smith et al.

[57] ABSTRACT

A liquid polymer which is rapidly curable, at room temperature, to a solid hydrolytically stable elastomer having high tensile and tear strengths, said liquid polymer having the formula:

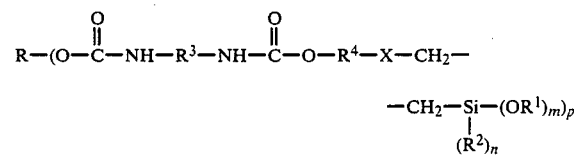

wherein R is a liquid polymeric backbone selected from the group consisting of polyether and polythioether, said backbone having a number average molecular weight of at least 1,500 and having no carboxyl or hydroxyl groups; $R^1$ is lower alkyl, $R^2$ is lower alkyl, $R^3$ is a divalent organic radical having no sulfur atoms, $R^4$ is alkylene of from 3 to 6 carbon atoms, and which separates the oxygen atom from X by at least 3 carbon atoms, X is sulfur or —S—$R^5$—S— wherein $R^5$ is alkylene having from 2 to 12 carbon atoms, alkylene thioether of from 4 to 12 carbon atoms or hydrocarbon ether of from 4 to 20 carbon atoms, p is 2 to 4, m is 1 to 3, n is 0 to 2 and the sum of m and n is 3. There is also disclosed a method for curing such liquid polymers.

16 Claims, No Drawings

SILANE TERMINATED LIQUID POLYMERS

BACKGROUND OF THE INVENTION

Liquid polymers, which cure at room temperature, have become increasingly important in the manufacturing and construction industries. Among the polymers commercially available for such purpose are mercaptan terminated polymers, silane terminated polymers, isocyanate terminated polymers and epoxide terminated polymers.

Each of these polymers have certain advantages for specific applications. However, in general it may be said that the silane terminated polymers are the most desirable because they have low odor and toxicity but their relatively poor physical properties have, to a great extent, restricted their use.

It would therefore be desirable to provide liquid polymers curable to elastomeric materials which have the desirable properties of silane terminated polymers (i.e. low odor and toxicity) but at the same time cure more rapidly, have good hydrolytic stability, high tensile and tear strengths and good elongation characteristics. Others have tried to produce silane terminated polymers as, for example, the addition of silanes to isocyanate terminated polyethers as shown in U.S. Pat. No. 3,632,557 (Brode et al.) and U.S. Pat. No. 3,979,344 (Bryant et al.). Both of these patents disclose the addition of amino silanes or mercapto silanes to isocyanate terminated polyurethanes. If one used a mercapto silane, the reaction would be such that the sulfur atom would be immediately adjacent to the carbamyl group thereby forming a thiourethane group which would result in an extremely unstable polymer, particularly to water. Exposure to hot water or high humidity at moderate temperatures would cause the cured elastomers to depolymerize and form soft, tacky semisolids.

Another approach to produce silane terminated polymers is set out in U.S. Pat. No. 4,426,506 issued Jan. 17, 1984. In this patent, there is disclosed a silane terminated ureide polymer which the patent states may be made by the addition of gamma mercapto propyl trimethoxy silane to an acrylic ureide polymer. The resulting silane terminated ureide is not a rapidly curing polymer at room temperature because the sulfur atom is separated from the silicon atom by three carbon atoms.

Another patent disclosing silane terminated polymers is U.S. Pat. No. 3,317,461 issued May 3, 1967. This patent discloses silane terminated polysulfides made, for example, by reacting a mercaptan terminated polysulfide with a silane having an olefinic double bond. The polymers of this patent do not, inter alia, have high tensile and tear strengths due to the lack of urethane groups.

U.S. Pat. No. 4,652,664 discloses compounds containing silicon atoms having hydrolyzable groups. These compounds may be made by reacting a mercaptan polyhydric alcohol with a vinyl type silane. The compounds disclosed in this patent are not polymers and cannot be cured to elastomeric products. By "elastomeric", I mean a rubber having at least 100% elongation with substantially full recovery. In addition, the compounds disclosed in U.S. Pat. No. 4,652,664 have very poor shelf stability due to the ester exchange between the free hydroxyl group and the silyl group.

SUMMARY OF THE INVENTION

The primary object of the present invention is to disclose and provide silane terminated liquid polymers which are rapidly curable, at room temperature, to solid elastomers which are hydrolytically stable (as compared to, e.g. polyesters or polyamides) and have better physical properties than known silane terminated polymers, such properties including high tensile and tear strengths and good elongation properties.

These objects and others are accomplished by the present invention by providing a liquid polymer of the formula:

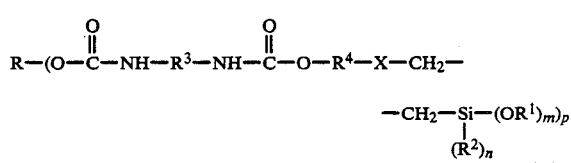

wherein R is a liquid polymeric backbone selected from the group consisting of polyether and polythioether, said backbone having a number average molecular weight of at least 1,500 and having no hydroxyl or carboxyl groups; $R^1$ is lower alkyl, $R^2$ is lower alkyl, $R^3$ is a divalent organic radical having no sulfur atoms, $R^4$ is an alkylene of from 3 to 6 carbon atoms, and which separates the oxygen atom from X by at least 3 carbon atoms, X is sulfur or —S—$R^5$—S— wherein $R^5$ is alkylene having from 2 to 12 carbon atoms, alkylene thioether of from 4 to 12 carbon atoms or hydrocarbon ether of from 4 to 20 carbon atoms (preferably alkylene of from 4 to 12 carbon atoms), p is 2 to 4, m is 1 to 3, n is 0 to 2 and the sum of m and n is 3.

The silane terminated liquid polymers are prepared by first reacting a hydroxyl terminated liquid polymer of the formula:

wherein R and p have the same meaning as indicated above, with an organic diisocyanate compound to produce an isocyanate terminated liquid polymer having the formula:

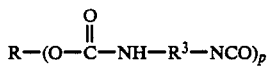

wherein R, $R^3$ and p have the same meaning as indicated above.

The above reaction is disclosed in U.S. Pat. No. 3,923,748 which disclosure is incorporated herein by reference.

The isocyanate terminated liquid polymer may then be reacted with (1) a mercapto alkylene alcohol of from 3 to 6 carbon atoms, the mercapto group and the group being separated by at least 3 carbon atoms or (2) an olefinic alkylene alcohol of from 3 to 6 carbon atoms, the olefin group being separated from the hydroxyl group by at least 1 carbon atom.

The above reactions produce, respectively, (1) a mercaptan terminated liquid polymer and (2) an olefin terminated liquid polymer.

Reaction 2 above between the isocyanate terminated liquid polymer and the olefinic alkylene alcohol is disclosed in U.S. Pat. No. 3,923,748, issued Dec. 2, 1975, such disclosure being incorporated herein by reference.

The olefin terminated liquid polymers produced as indicated above are then reacted with (3) a dimercapto organic compound which may be a dimercapto alkylene having from 2 to 12 carbon atoms, a dimercapto lower alkylene thioether having from 4 to 12 carbon atoms or a dimercapto hydrocarbon ether of from 4 to 20 carbon atoms, preferably a dimercapto alkylene ether of from 4 to 12 carbon atoms. Exemplary of such dimercapto organic compounds are 1,6-dimercapto hexane; 1,2-dimercapto ethane; beta,beta'-dimercapto diethyl ether; beta, beta'-dimercapto diethyl sulfide, p,p'-dimercapto methyl diphenyl oxide, and 1,11-dimercapto-6-oxa-3,9-dithia undecane.

It should be noted that reaction (3) above is disclosed in U.S. Pat. Nos. 3,923,748 and 4,366,307, the disclosure of both of these patents being incorporated herein by reference.

Reactions (1) and (3) produce a mercaptan terminated liquid polymer which is then reacted with a vinyl alkoxy silane having the formula:

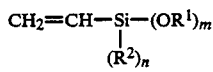

$$CH_2=CH-\underset{(R^2)_n}{Si}-(OR^1)_m$$

wherein $R^1$, $R^2$, m and n have the same meaning as indicated above.

The silane terminated liquid polymers of the present invention are distinguished from the prior art by having the following properties: rapidly curable to an elastomer which is hydrolytically stable and has excellent tensile and tear strengths as well as good elongation properties. This is due to the presence of urethane groups in the terminal radicals, and also because all the sulfur atoms in such radicals are located at least three carbon atoms from the urethane groups and the sulfur and silicon atoms are separated by two carbon atoms, i.e. the silicon atom is beta to the sulfur atom.

All of the above are necessary in order to achieve the unique properties of the silane terminated liquid polymers of the present invention.

I have found that when such mercaptan terminated liquid polymers having the above formula are reacted with vinyl alkoxy silanes of the formula above, in the absence of catalysts which actively promote the condensation of the alkoxy silane groups, the resulting silane terminated liquid polymers have the following properties:

(1) Greatly reduced odor;
(2) Reduced toxicity;
(3) Improved resistance to water swell when cured;
(4) Unexpectedly rapid cure rates;
(5) High tensile strength;
(6) High tear strength;
(7) Excellent elongation properties;
(8) Unexpectedly high capability of dilution with normal formulating ingredients (e.g. fillers, plasticizers, etc.) without substantial loss of physical properties;
(9) Excellent storage stability; and
(10) Good adhesion properties without the necessity of using primers.

It should be noted that the reaction disclosed in the Blanco U.S. Pat. No. 4,426,506, wherein an acrylic terminated liquid polymer is reacted with gamma mercapto propyl trialkoxy silane, gives a liquid polymer of much lower reactivity than the polymers of the present invention. As noted in the present invention the presence of a silicon atom which is beta to the sulfur atom (i.e. two carbons away) greatly enhances the cure rate of the silane terminated liquid polymers of the present invention as compared with silane terminated polymers wherein the silicon atom is three carbon atoms from the sulfur atom.

DETAILED DESCRIPTION OF THE INVENTION

It is presently believed that the above enumerated unique properties of the silane terminated liquid polymers of the present invention are not dependent upon the particular polymeric backbone in the starting mercaptan terminated polymers. To a greater or lesser degree, other properties of the silane terminated polymers of the present invention may be different depending on the polymeric backbone, as is known to those skilled in the art. For example, if the polymeric backbone exhibits relatively high water vapor permeability, the resulting silane terminated liquid polymer lends itself to formulations of one component, moisture activated products which cure rapidly and have high tensile and tear strength as well as good elongation properties at room temperature. In addition, the polymers of the present invention do cure rapidly at room temperature and may be formulated as either one part or two part products.

In general, the polymeric backbone should have a number average molecular weight of greater than about 1,500. I have found that polymeric backbones having less than this do not cure to elastomers. Generally speaking, it is presently preferred that the polymeric backbone has a number average molecular weight of between about 1,500 and 20,000.

The polymeic backbone (i.e. R) in the present invention is provided by the known and numerous hydroxyl terminated liquid polyethers and polythioethers and which do not contain any other hydroxyl groups or carboxyl groups. Liquid polymers having two to four terminal hydroxyl groups which are useful in the present invention include polyethers such as polyoxypropylene polyols, polyoxypropylene polyoxy ethylene copolymer polyols, polyoxytetramethylene polyols, and polythioether polyols such as those disclosed in U.S. Pat. No. 4,366,307.

As noted above, the hydroxyl terminated liquid polymers are reacted with an organic diisocyanate compound (preferably a hydrocarbon diisocyanate or hydrocarbon ether diisocyanate having, for example, about four to twenty carbon atoms in the hydrocarbon chain). Most organic diisocyanates may be employed and include tolylene diisocyanate; diphenylmethane 4,4'-diisocyanate; 1,6-hexamethylene diisocyanate; dicyclohexylmethane-4,4'-diisocyanate; isophorone diisocyanate and tetramethylxylene diisocyanate.

The reaction between the hydroxyl terminated polymer and organic diisocyanate is straightforward and known in the art. For example, no catalysts are used, the reaction taking place at slightly elevated temperatures (between 50° C. and 100° C. being preferred).

As noted previously, the resulting isocyanate terminated liquid polymer may then be reacted with either of two types of compounds. One of these compounds is a mercapto alkylene alcohol of from 3 to 6 carbon atoms, the mercapto group being separated from the hydroxyl group by at least 3 carbon atoms. The second compound which may be reacted with the isocyanate terminated liquid polymers is an olefinic alcohol of from 3 to 6 carbon atoms; the olefin group being separated by at least 1 carbon atom from the hydroxyl group.

Exemplary of mercaptan organic alcohols useful in the present invention are 3-mercapto-1-propanol and 4-mercapto-1-butanol.

Exemplary of olefinic alcohols useful in the present invention are allyl alcohol and methallyl alcohol.

The first reaction between the mercaptan organic alcohol and isocyanate terminated liquid polymer is conducted by merely heating the reactants, in the absence of a catalyst at, e.g. a temperature of between abut 50° C. to 100° C.

The second reaction between the olefinic alcohol and isocyanate terminated liquid polymer is equally straight forward, i.e. no catalysts and only a slightly elevated temperature of about 50° C. to 100° C. are used.

The above reactions produce, respectively, a mercaptan terminated liquid polymer and an olefin terminated liquid polymer. The latter is converted to a mercaptan liquid polymer by reacting it with a dimercapto organic compound in the presence of an alkaline initiator having a pKa value of 6.0 or less and no aryl groups as disclosed in U.S. Pat. No. 3,923,748.

The above reactions produce mercaptan terminated polymers which, when reacted with a vinyl alkoxy silane, produce the silane terminated liquid polymers of the present invention.

As has been noted hereinbefore, the silane terminated liquid polymers of the present invention are produced by reacting the mercaptan terminated liquid polymer with a vinyl alkoxy silane.

The reaction is relatively simple and straight forward, the molar ratio of mercaptan terminated polymer to vinyl alkoxy silane being from about 1.0 to about 1.1. The reaction requires the use of a catalyst, said catalyst being either an azobis lower alkyl nitrile or an organic peroxide. Examples of organic peroxides are aryl peroxides such as t-butyl perbenzoate and benzoyl peroxide. Examples of azobis lower alkyl nitrile are azobis (isobutyronitrile) and azobis (2,4-dimethylvaleronitrile).

The amount of catalyst is not particularly important but, in general, it may be said that the amount is between about 0.2 wt. % and about 1.0 wt. %.

The temperature of the reaction should be such that the vinyl radical of the vinyl alkoxy silanes reacts with the mercaptan radical of the mercaptan terminated liquid polymer. It is preferred if the temperature is between about 50° C. and 125° C. with the more preferred range being about 70° C. and 110° C.

Alkoxy vinyl silanes which are useful in the present invention include vinyl trimethoxy silane, vinyl methyl dimethoxy silane, vinyl triethoxy silane and vinyl ethyl diethoxy silane.

The silane terminated liquid polymers of the present invention are easily cured, at room temperature, to solid, elastomeric products with a variety of catalysts, such catalysts being generally known in the art. Known catalysts useful in the present invention include organo-tin compounds such as dibutyl tin dilaurate, dibutyl tin diacetate, etc.

In addition to those catalysts known in the art to be useful in the curing of silane terminated polymers, I have found that a particular class of compounds, when used to cure the silane terminated liquid polymers of this invention produce solid elastomers having unexpectedly high strength and good elongation properties.

This class of compounds which are particularly useful in curing the silane terminated polymers, are organotitanates which are soluble in the polymers of this invention when present in curing effective amounts.

Exemplary of titanates useful as curing catalysts in the present invention are aliphatic titanates (e.g. from 1 to 12 carbon atoms) such as lower alkyl titanates (e.g. tetrabutyl titanate, tetraethyl titanate, etc.). When such titanates are added to the liquid polymers of the present invention, all that is necessary to effect a cure is to expose the mixture to moisture in the ambient atmosphere.

The amount of organo-titanate may vary widely but, in general, will be from 0.5 weight percent to 10 weight percent, based on the amount of polymer.

Cure rates of between a few minutes to 24 hours at room temperature are readily obtainable to give hydrolytically stable elastomers.

The elastomers of this invention possess such excellent physical properties that more than the usual amount of fillers, plasticizers and other formulating ingredients can be used for compounding the silane terminated polymers of this invention. For example, Thiokol polymers and a silane terminated polymer sold under the tradename Kaneka MS and disclosed in U.S. Pat. No. 3,971,751 cannot be compounded with more than about 200 parts by weight (based on 100 parts by weight of the polymer) of the usual formulating ingredients. Surprisingly, the polymers of this invention can contain over 700 parts by weight (based on 100 parts by weight of polymer) of the normal formulating ingredients such as fillers and plasticizers.

The silane terminated liquid polymers are superior in a variety of end use applications including production of caulking or sealing compounds such as expansion joint sealants for the construction industry, insulating glass sealants for double or triple pane windows and automotive windshield sealants where rapid cure and adhesion without use of primers is essential. Fuel resistant aircraft sealants can also be prepared provided that a fuel resistant backbone is utilized as "R", such as those disclosed in U.S. Pat. No. 4,366,307.

The liquid polymers of this invention are also unexpectedly useful as adhesion promoters for other polymer compositions on a wide variety of substrates. For example, the liquid polymers of the present invention are particularly useful in promoting adhesion of thermoplastic hot melt compositions. Another example is Thiokol polysulfide compositions which do not generally have good adhesion properties and therefore are oftentimes mixed with phenolics and epoxies to increase adhesion. Adding from 0.1 to 10 wt. % of the polymer of this invention to polymer compositions, such as Thiokol polysulfides and mercaptan terminated polymers disclosed in U.S. Pat. Nos. 3,923,748; 4,366,307 and 4,623,711, greatly increases the adhesion of such polymers to most substrates.

Both one and two part sealants can be prepared because of the inherent shelf stability of the silane terminated polymers of this invention.

In order to further illustrate the present invention, presently preferred exemplary embodiments are given below and a comparison between the cure rate of the silane terminated liquid polymers of the present invention with those of the prior art are given.

EXAMPLE 1

Preparation of a branched polyether vinyl trimethoxy silane terminated polymer was carried out as follows: to 1500 grams of a polyoxypropylene polyoxyethylene polyol having a number average molecular weight of 6000 and a hydroxyl number of 28.0 was added 130.5 grams of tolylene diisocyanate. This mixture was heated at 158° F. for 24 hours. To the resulting isocyanate terminated polymer with NCO content of 1.85%, 69.2 grams of gamma mercaptopropanol (mercaptan equivalent of 96.4) was added. This mixture was heated at 190° F. for 18 hours. A mercaptan terminated polymer with a mercaptan equivalent of 2370 resulted. To this mercaptan terminated prepolymer, was added 106.4 grams of vinyl trimethoxy silane. Also added was 85.0 grams of dry methanol and 17.0 grams of 2,2' azobis (isobutyronitrile) as free radical catalyst. The mixture was heated at 190° F. for 2.5 hours. There was obtained a trimethoxy silane terminated liquid polymer which gave a mercaptan equivalent in excess of 150,000.

EXAMPLE 2

Preparation of a linear polyether triethoxy silane terminated polymer containing urethane groups in the backbone was carried out as follows: to 1500 grams of a polyoxypropylene diol having a number average molecular weight of 3000, and a hydroxyl number of 37.6 was added 131.2 grams of tolylene diisocyanate. The mixture was kept at 158° F. for 24 hours. An isocyanate terminated polyether containing urethane groups in the backbone resulted. To this polyether, 49.4 grams of gamma mercaptopropanol (mercaptan equivalent weight of 94.6) was added. This mixture was heated at 190° F. for 18 hours, and resulted in a mercaptan terminated polymer of 3220 equivalent weight. To the resulting polymer, 99.4 grams of vinyl triethoxy silane (olefin equivalent weight: 190.31 grams/equivalent) was added. Also added was 84 grams of dry methanol and 16.8 grams of 2,2,-azobis (isobutyronitrile) as free radical initiator. This mixture was heated at 190° F. for 2.5 hours when a polymer with a mercaptan equivalent in excess of 150,000 was obtained. This result indicated complete conversion. There was obtained a linear, triethoxy silane terminated liquid polymer.

EXAMPLE 3

Preparation of a branched polyether vinyl trimethoxy silane terminated polymer was carried out as follows: to 2040 grams of polyoxypropylene polyoxyethylene triol having a number average molecular weight of 6000 and a hydroxyl number of 27.5 was added 174 grams of tolylene diisocyanate. The mixture was reacted at 158° F. for 24 hours. To the above isocyanate terminated prepolymer was added 58 grams of 2-propen-1-ol and the mixture allowed to react at 158° F. for an additional 24 hours. To this olefin terminated polymer was added 182 grams of 1,8-dimercapto-3,6-dioxaoctane, 11.4 grams of tert-butyl peroxybenzoate and 1.1 grams of tetramethylguanidine. This mixture was allowed to react 16 hours at 158° F. Analysis by infrared spectroscopy showed no unreacted olefin groups and iodine titration indicated a mercaptan equivalent weight of 2780. To this mercaptan terminated polymer was added 131.3 grams of vinyltrimethoxysilane, 24.7 grams of 2,2,-azobis(isobutyronitrile), and 123 grams of dry methanol. The mixture was reacted at 180° F. for 2.5 hours. The resulting liquid polymer had a mercaptan equivalent weight in excess of 150,000.

EXAMPLE 4

Preparation of a trimethoxy silane terminated polymer was carried out as follows: To 100 parts by weight of the olefin terminated polymer of Example 1 of U.S. Pat. No. 3,923,748 was added 8 parts by weight of beta, beta, dimercapto diethyl sulfide, 0.5 parts by weight of t-butyl perbenzoate and 0.05 parts by weight of tetramethyl guanidine. The procedure of Example 11 of U.S. Pat. No. 3,923,748 was used to produce a mercaptan terminated liquid polyether of 2,230 equivalent weight. To 1,500 grams of the mercaptan terminated liquid polymer was added 99.6 grams of vinyl trimethoxysilane. Also added was 15 grams (one part per hundred parts of resin, hereinafter referred to as "phr") of 2,2'azobis (isobutyronitrile) as a free radical initiator, and 75.0 grams (5 phr) of dry methanol. The mixture was reacted at 180° F. for 2.5 hours. The resulting trimethoxy silane terminated liquid polymer had a mercaptan equivalent weight in excess of 150,000.

EXAMPLE 5

Alkoxysilane terminated liquid polyether having a sulfur atom beta to the silicon atom was prepared as follows: to 6000 grams of polyoxypropylene diol having a number average molecular weight of 3000, and a hydroxyl number of 37.4 was added 522 grams of tolylene diisocyanate. The mixture was reacted at 60° C. for 24 hours. To this prepolymer was added 184 grams of 3-mercapto-1-propanol and the mixture was kept at 100° C. for 16 hours. Infrared analysis indicated no residual unreacted isocyanate. To this mercaptan terminated polymer was added 296 grams of vinyl trimethoxy silane, 33.5 grams of azobis (isobutyronitrile), and 134 grams of methanol. This mixture was kept at 82° C. for 6 hours. Completion of reaction was indicated by analysis for mercaptan equivalent which was found to be in excess of 150,000.

EXAMPLE 6

Alkoxy silane terminated liquid polymer having a sulfur atom gamma to the silicon atom was prepared as follows: to 6000 grams of a polyoxypropylene diol having a number average molecular weight of 3000 and a hydroxyl number of 37.4 was added 522 grams of tolylene diisocyanate. The mixture was reacted at 60° C. for 24 hours. To this isocyanate terminated prepolymer was added 116 grams of 2-propen-1-ol and the mixture allowed to react for an additional 24 hours. Infrared analysis indicated the absence of any residual unreacted isocyanate. To this olefin terminated polymer was added 393 grams of 3-mercapto propyl trimethoxy silane, 33.2 grams of azobis (isobutyronitrile) and 133 grams of methanol. The mixture was kept at 82° C. for 6 hours after which analysis indicated a mercaptan equivalent in excess of 150,000.

EXAMPLE 7

The alkoxysilane terminated liquid polymers prepared in Examples 5 and 6 were formulated into stable, single package materials as follows:

|  | Parts by Weight |
|---|---|
| Alkoxysilane Polymer, Example 5 or 6 | 100 |
| Carbon Black | 50 |

-continued

| | Parts by Weight |
|---|---|
| Diisodecyl phthalate | 20 |
| Calcium Carbonate | 20 |
| Tetrabutyl Titanate | 5 |

The physical properties of these formulations are listed in Table I.

TABLE I

Comparison of the properties of single package formulations from Examples 5 and 6.

| | Polymer From Example 5 | Polymer From Example 6 |
|---|---|---|
| Cure Rate, 6.5 mm × 6.5 mm × 100 mm bead specimen, lbs. to rupture[1] | | |
| after 5.5 hours | 77 | 40 |
| after 24 hours | 185 | 120 |
| Lap Shear Strength, 6.5 mm × 6.5 mm × 25 mm bead, PSI | | |
| after 2 hours | 1.5 | 0.98 |
| after 4 hours | 36 | 18 |
| after 6 hours | 44 | 37 |
| after 24 hours | 136 | 94 |
| Physical Properties, after 24 hours | | |
| Tensile Strength, PSI | 603 | 434 |
| Elongation, % | 500 | 550 |
| Hardness, Shore A | 57 | 49 |

[1]Lbs. to rupture is determined by applying the respective sealant beads between two 2 inch by 6 inch glass panels. At the specified time intervals the glass panels are pulled apart by applying tension normal to panes of glass.

The foregoing test results shown in Table 1 clearly indicate that the rate of curing of sealants based on polymers in which the silicon atom is in the beta position to the sulfur atom is much faster than sealant based on polymers wherein the silicon atom is in the gamma position to teh sulfur atom.

I claim:

1. A liquid polymer which is rapidly curable, at room temperature, to a solid hydrolytically stable elastomer having high tensile and tear strengths, said liquid polymer having the formula:

$$R-(O-\overset{O}{\underset{\|}{C}}-NH-R^3-NH-\overset{O}{\underset{\|}{C}}-O-R^4-X-CH_2-$$
$$-CH_2-\underset{(R^2)_n}{\overset{|}{Si}}-(OR^1)_m)_p$$

wherein R is a liquid polymeric backbone selected from the group consisting of polyether and polythioether, said backbone having a number average molecular weight of at least 1,500 and having no carboxyl or hydroxyl groups; $R^1$ is lower alkyl, $R^2$ is lower alkyl, $R^3$ is a divalent organic radical having no sulfur atoms, $R^4$ is alkylene of from 3 to 6 carbon atoms, and which separates the oxygen atom from X by at least 3 carbon atoms, X is sulfur or —S—$R^5$—S— wherein $R^5$ is alkylene having from 2 to 12 carbon atoms, alkylene thioether of from 4 to 12 carbon atoms or hydrocarbon ether of from 4 to 20 carbon atoms, p is 2 to 4, m is 1 to 3, n is 0 to 2 and the sum of m and n is 3.

2. A liquid polymer according to claim 1 wherein R has a number average molecular weight of between about 1,500 and 20,000.

3. A liquid polymer according to claim 2 wherein R is polyether.

4. A liquid polymer according to claim 2 wherein R is polythioether.

5. A liquid polymer according to claim 1 wherein $R^1$ is methyl and $R^2$ is methyl.

6. A liquid polymer according to claim 1 wherein $R^1$ is methyl and m is 3.

7. A liquid polymer according to claim 1 wherein X is sulfur.

8. A liquid polymer according to claim 7 wherein $R^4$ is propylene.

9. A liquid polymer according to claim 1 wherein X is —S—$R^5$—S—.

10. A liquid polymer according to claim 9 wherein $R^5$ is alkylene of from 2 to 6 carbon atoms.

11. A liquid polymer according to claim 9 wherein $R^5$ is alkylene ether of from 4 to 12 carbon atoms.

12. A cured liquid polymer which is cured using organo titanate to a solid hydrolytically stable elastomer which has high tensile and tear strengths, said liquid polymer having the formula:

$$R-(O-\overset{O}{\underset{\|}{C}}-NH-R^3-NH-\overset{O}{\underset{\|}{C}}-O-R^4-X-CH_2-$$
$$-CH_2-\underset{(R^2)_n}{\overset{|}{Si}}-(OR^1)_m)_p$$

wherein R is a liquid polymeric backbone selected from the group consisting of polyether and polythioether, said backbone having a number average molecular weight of at least 1,500 and having no carboxyl or hydroxyl groups; $R^1$ is lower alkyl, $R^2$ is lower alkyl, $R^3$ is a divalent organic radical having no sulfur atoms, $R^4$ is alkylene of from 3 to 6 carbon atoms, and which separates the oxygen atom from X by at least 3 carbon atoms, X is sulfur or —S—$R^5$—S— wherein $R^5$ is alkylene having from 2 to 12 carbon atoms, alkylene thioether of from 4 to 12 carbon atoms or hydrocarbon ether of from 4 to 20 carbon atoms, p is 2 to 4, m is 1 to 3, n is 0 to 2 and the sum of m and n is 3.

13. A cured liquid polymer according to claim 12 wherein R has a number average molecular weight of between about 1,500 and 20,000.

14. A cured liquid polymer according to claim 13 wherein said organo-titanate is an aliphatic titanate.

15. A cured liquid polymer according to claim 13 wherein said organo-titanate is lower alkyl titanate.

16. A cured liquid polymer according to claim 13 wherein the amount of organo-titanate is from about 0.5 weight percent to about 10 weight percent based on the weight of said cured liquid polymer.

* * * * *